United States Patent
Valles (10) Patent No.: US 9,142,137 B1
(45) Date of Patent: Sep. 22, 2015

(54) SYSTEM AND METHOD FOR DERIVING QUESTIONS, ANSWERS AND GRAMMARS FROM TEXTS AND SUMMARIZING TEXTUAL INFORMATION

(76) Inventor: Luis Valles, Phoenix, AZ (US)

( * ) Notice: Subject to any disclaimer, the term of this patent is extended or adjusted under 35 U.S.C. 154(b) by 248 days.

(21) Appl. No.: 13/573,288

(22) Filed: Sep. 7, 2012

Related U.S. Application Data (60) Provisional application No. 61/532,066, filed on Sep. 7, 2011.

(51) Int. Cl.
*G06F 17/20* (2006.01)
*G09B 5/00* (2006.01)
*G06F 17/21* (2006.01)

(52) U.S. Cl.
CPC ............... *G09B 5/00* (2013.01); *G06F 17/211* (2013.01)

(58) Field of Classification Search
USPC ........................................................ 704/9, 10
See application file for complete search history.

(56) References Cited

U.S. PATENT DOCUMENTS

| 7,377,785 | B2 * | 5/2008 | Ullman et al. | 434/323 |
| 2005/0171778 | A1 * | 8/2005 | Sasaki et al. | 704/269 |
| 2009/0037398 | A1 * | 2/2009 | Horvitz et al. | 707/4 |
| 2009/0055163 | A1 * | 2/2009 | Jindal et al. | 704/9 |

* cited by examiner

*Primary Examiner* — Abul Azad (57) ABSTRACT

A system and computer-implemented method that includes analyzing content of textual information, automatically deriving a plurality of questions from the analyzed content, presenting the plurality of questions derived, to a user via a user interface, determining, via the user, a validity of the plurality of questions, and generating at least one valid question as determined by a user along with a corresponding answer to at least one valid question. The method further includes generating a summary of the textual information using the answers generated. The method further includes the ability of generate grammars for parsing natural language phrases.

27 Claims, 9 Drawing Sheets

ONTOLOGY LOOKUP TABLE

| Words/Phrases | Ontology Categories | Question Headers |
|---|---|---|
| "Washington D.C." | PLACE | WHERE |
| "Ford's Theatre" | PLACE | WHERE |
| "April 14, 1865" | TIME | WHEN |
| "Next Morning" | TIME | WHEN |
| "While Watching a Play" | TIME | WHEN |
| "As part of a larger Conspiracy" | CAUSE | WHY |

SYSTEM AND METHOD FOR DERIVING QUESTIONS, ANSWERS AND GRAMMARS FROM TEXTS AND SUMMARIZING TEXTUAL INFORMATION

CROSS REFERENCE TO RELATED APPLICATIONS

This application claims the benefit of the provisional patent application No. 61/532,066 filed on Sep. 7, 2011

BACKGROUND

The present invention relates to data analysis and processing, and more specifically, to a system and method for deriving questions and answers and summarizing textual information based upon the analysis thereof. Part of the method for deriving questions can be utilized for generating context free grammars that can parse said questions. That is, said context free grammars can in term be utilized for processing speech recognition of said questions (utterances) or for a variety of natural language processing programs, which typically rely on speech grammars.

Today, organizations such as companies, libraries, educational institutions, for example, publish and store hundreds of documents in their computer network that contain pertinent information to be retrieved by users (e.g., employees, students, and the general public). These users may typically have similar questions regarding the content of the textual information in these documents. Conventionally, these organizations may provide a document or page (e.g., a web page) for frequently asked questions (i.e., FAQs) that provides questions and answers to similar questions asked by various users. These questions may be general questions concerning for example, procedures, rules, timelines or an application process. However, these FAQs documents may not provide answers to more specific questions of a user that may be answered implicitly or explicitly by the textual information contained with the documents. Thus, it may take a user a number of days, weeks or months of reading through the documents before finding the answer to their specific questions. While the textual information of these documents is important for reference, obtaining answers to specific questions regarding the textual information is more important and useful to the users.

In a fully automated computer environment, once the questions have been captured, processing the questions for retrieving the answers typically requires the use of context free grammars that can process those questions. In this invention, substantial number of questions would likely be generated. For a software developer, handwriting the grammars that can process said questions would be a daunting task.

Therefore, it is desirable to provide a system and method for automatically deriving all potential questions and answers available from the content of the textual information within the documents.

It is further desirable to provide a system for automatically deriving the context free grammars that can process the generated questions, at the same time and in the same manner that is consistent with the method for generating the questions.

SUMMARY

The present invention provides a system and method for automatically deriving questions and answers from textual information by analyzing content of the textual information, and summarizing the content of the textual information based upon the generated questions. Further, the method of the present invention includes generating and pruning all permutations of questions via a user interface, which can concurrently produce the context free grammars necessary to process the questions.

According to one embodiment of the present invention, a computer-implemented method that includes analyzing content of textual information, automatically deriving a plurality of questions from the analyzed content, presenting the plurality of questions derived, to a user via a user interface, determining, via the user, a validity of the plurality of questions, and generating at least one valid question as determined by a user along with a corresponding answer to the at least one valid question, and generating the context free grammars that can parse said generated questions.

A computer program product and system performing the above-mention method are also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 9:
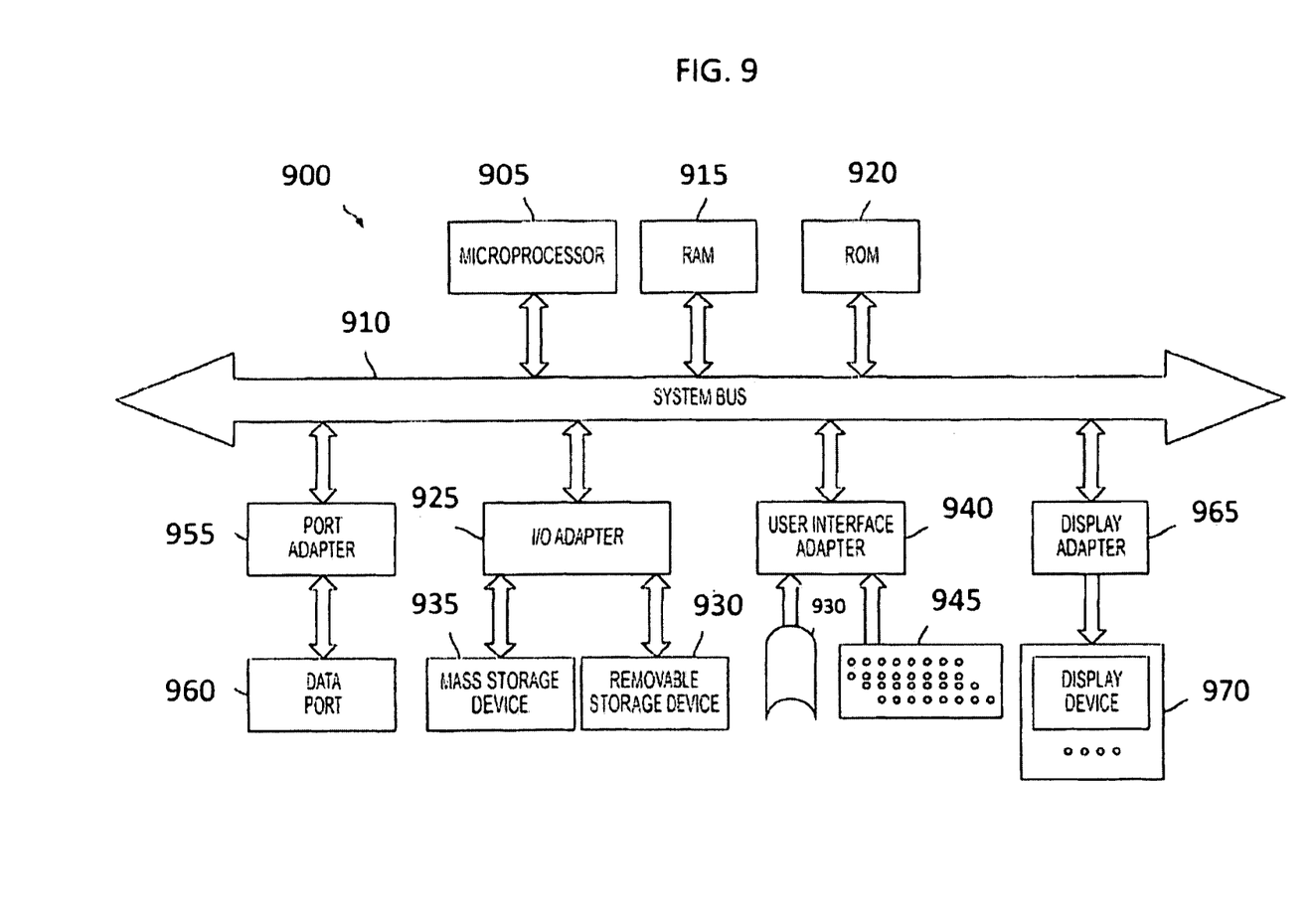
FIG. 9 is a diagram illustrating a general purpose computer that can be utilized for implementing embodiments of the present invention.

The present invention provides a computer-implemented method and system for analyzing the content of textual information within documents and/or pages (e.g., a web page) and automatically deriving questions and answers that may be pertinent to a user. The method may be implemented as software or hardware via a general computer system (as depicted in FIG. 9, for example). The method may also be implemented via a communication network such as the Internet. A detailed description for deriving questions and answers will be described below with reference to the flow diagrams in FIGS. 1 through 4. According to one embodiment of the present invention, all potential relevant questions about a subject may be automatically obtained upon analyzing the content of textual information. For example, when given the following textual information:

"President Abraham Lincoln was assassinated on Apr. 14, 1865, as the American Civil War was drawing to a close.[1] Lincoln was shot while watching a play at Ford's Theatre in Washington, D.C.,[2] and died the next morning.[3] The murder of the President was planned and carried out by a well-known actor John Wilkes Booth as a part of a larger conspiracy intended to rally the remaining Confederate troops to continue fighting.[4]"

According to an embodiment of the present invention, the following questions may be automatically derived based on the content (e.g., the subject) of the textual information:

1) Where was Lincoln assassinated?
2) When was Lincoln assassinated?
3) When did Lincoln die?
4) Who shot President Lincoln?
5) Who planned the murder?
6) Why did John Wilkes plan to murder Lincoln?
7) Who is John Wilkes?

Figure 1:
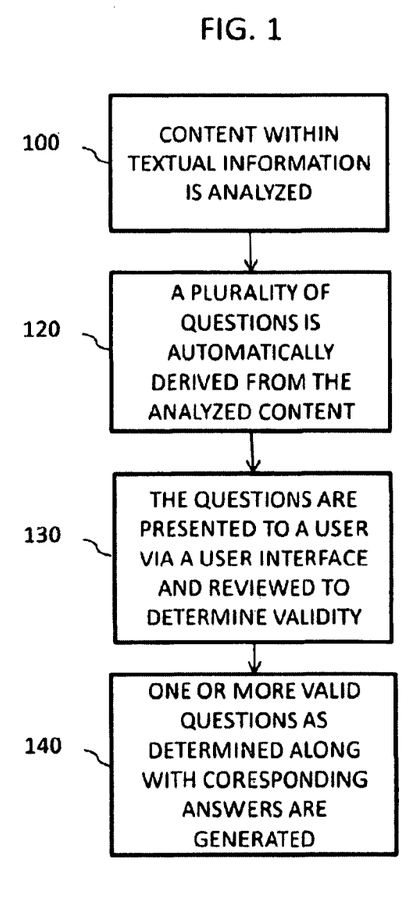
FIG. 1 is a flow diagram illustrating a method for generating questions and answers from textual information that can be implemented within embodiments of the present invention.

A computer-implemented method for generating questions and answers from the textual information will be discussed below with reference to FIG. 1. As shown in FIG. 1, at operation 100, the content of the textual information is analyzed. From operation 100, the process continues to operation 120, where a plurality of questions is automatically derived from the analyzed content.

Then, the process continues to operation 130, where the plurality of questions derived are displayed to a user via a user interface such as a graphical user interface (GUI), for example, and the user is able to review the questions generated and determine a validity of each question. Once determined at operation 140, one or more valid questions as determined by a user along with a corresponding answer to each question are generated.

Details regarding analyzing the content of the textual information at operation 100 of FIG. 1 will now be described below with reference to FIG. 2.

Figure 2:
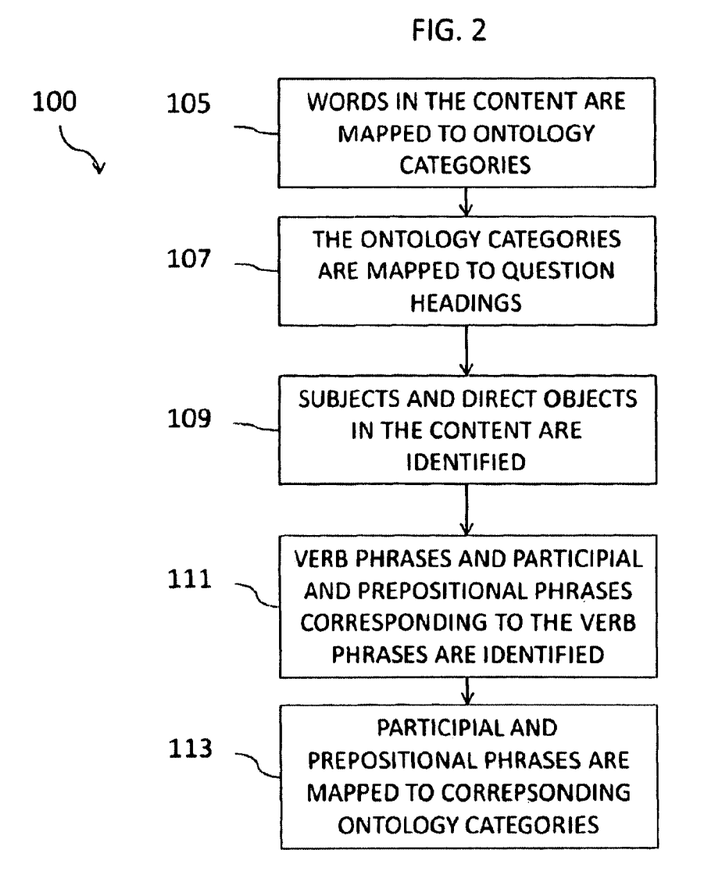
FIG. 2 is a flow diagram illustrating the operation of analyzing the content of the textual information of FIG. 1 that can be implemented within embodiments of the present invention.

As shown in FIG. 2, at operation 105, a plurality of words in the content is mapped to a plurality of ontology categories. According to an embodiment of the present invention, the ontology categories include but are not limited to Time, Time length, Quantity, Place, Manner, Cause, or Person. Referring back to the textual information above, the terms, "Washington D.C." and "Ford's Theatre" are Places while the terms "President", "Abraham Lincoln" and "John Wilkes Booth" are Persons. Further, the terms "April 14, 1865", "next morning" and "while watching a play" are Times and the phrase "as a part of a larger conspiracy" is a Cause.

From operation 105, the process continues to operation 107, where the content of the textual information is further analyzed by mapping the plurality of ontology categories to a plurality of question headings. According to an embodiment of the present invention, the plurality of question headings correspond to the plurality of ontology categories and include but are not limited to "When", "How Long", "How Much", "Where", "How", "What", "Why" or "Who". Thus, "Why" question heading may be mapped to the ontology category "Cause;" and "Where" question heading may be mapped to the ontology category "Place;" and "Who" question heading may be mapped to the ontology category "Person".

According to an embodiment of the present invention, the plurality of ontology categories are mapped to the plurality of question headings by determining patterns between the words of the content, and identifying the plurality of question headings to be mapped based upon the determined patterns. One example of a pattern is that, "as part of a larger conspiracy" is related to a "Cause" and mapped to a "Why" question header. In another example, "Apr. 14, 1865", "next morning" and "while watching a play" are all related to "Time" and therefore mapped to a "When" question header.

From operation 107, the process continues to operation 109 where any subjects and direct objects in phrase structures of the content are identified. For example, in the above-mentioned textual information and based on the syntactical structure of the four (4) sentences, the following subjects and direct object are identified:

Subject of $1^{st}$ Sentence: President Abraham Lincoln
Subject of $2^{nd}$ Sentence: Lincoln
Subject of $3^{rd}$ Sentence: Lincoln
Subject of $4^{th}$ Sentence: John Wilkes Booth
Direct Object of the $4^{th}$ Sentence: murder According to one embodiment of the present invention, synonyms may be eliminated from the list of subjects and direct objects. For example, "President Abraham Lincoln" or "Lincoln" may be eliminated from the list above.

There are other nouns and proper names in the sentences such as Ford's Theatre or Confederate troops; however, these are not main subjects in the phrase structures. Therefore, according to an embodiment of the present invention, these nouns and proper names may not be identified.

From operation 109, the process continues to operation 111 where verb phrases including at least one main verb within the context are identified along with prepositional phrases corresponding to the verb phrases identified. For example, in the textual information above, the following verbs are identified:

Verb of Sentence 1: assassinate
Verb of Sentence 2: shoot
Verb of Sentence 3: die
Verb of Sentence 4: plan and carry out According to an embodiment of the present invention, the verb phrases may be in the form of functions with an argument of an associated ontology category of the plurality of ontology categories. For example, the verb "shoot" may be represented as the function "murder (X,Y) where X may only be a Person type of ontology category.

Although there are other verbs in the textual information such as "drawing", "intended" and "continue", syntactically, these are not the main verbs in the verb phrases.

The following participial and prepositional phrases associated with the verb phrases are identified as follows:

"on April 14, 1865"
"of the President"
"at Ford's Theatre in Washington, D.C."
"the next morning by a well-known actor"

From operation 111, the process continues to operation 113 where each participial and prepositional phrase is mapped to a corresponding ontology category of the plurality of ontology categories. In this example, these participial and prepositional phrases are mapped to "Time", "Manner" and "Place" ontology categories.

Figure 3:
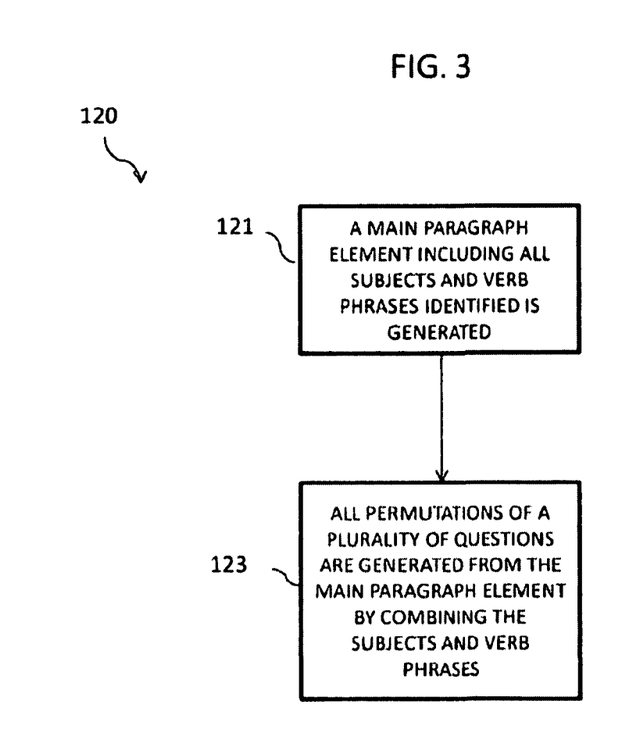
FIG. 3 is a flow diagram illustrating the operation of generating questions from the textual information from FIG. 1 that can be implemented within embodiments of the present invention.

From operation 113, the process then continues to operation 120 (as depicted in FIG. 1) where a plurality of questions is automatically derived from the analyzed content. Details of operation 120 will now be discussed with reference to FIG. 3. As shown in FIG. 3, at operation 121, the questions are derived by generating a main paragraph element which includes all the subjects and verb phrases identified during the analysis operation (e.g., operations 109 and 111 shown in FIG. 2). Based upon the textual information above, the following main paragraph element would be generated:

<PARAGRAPH name="paragraph1">
<SLOT type="subject" name="Lincoln" \>
<SLOT type="subject" name="John Wilkes Booth" \>
<SLOT type="verb" name="assassinate" \>
<SLOT type="verb" name="shoot" \>
<SLOT type="verb" name="carry out" \>
</ PARAGRAPH>

From operation 121, the process returns to operation 123 where all permutations of a plurality of questions are generated from the main paragraph element above, by combining the subjects with the verb phrases identified. According to an embodiment of the present invention, the main paragraph element may be written in passive voice while the plurality of questions are generated in active voice. For example, the following list of questions are generated from the textual information above:

"Did Lincoln assassinate John Wilkes?"
"Did John Wilkes assassinate Lincoln?"
"Did Lincoln shoot?"
"Did Lincoln shoot John Wilkes?"
"Did Lincoln shoot the murder?"
"Did John Wilkes plan the murder?"
"Did Lincoln plan the murder?"
"Did the murder plan Lincoln?"
"Did the murder plan John Wilkes?"
"Did the murder shoot Lincoln?"
"Did the murder shoot John Wilkes?"

Now referring back to FIG. 1, the process then continues to operation 130, where the permutations of the plurality of questions are presented to the user via the user interface and the user determines a validity of each permutation of the plurality of questions and eliminates any invalid permutations of the plurality of questions. According to another embodiment of the present invention, the permutations of the plurality of questions may be narrowed down by maintaining the sentence structure of the questions as the same sentence structure in the sentences provided in the content of the textual information.

According to an embodiment of the present invention, when eliminating a single permutation of a question of the plurality of questions, any remaining permutations including a permutation subset of the single permutation are automatically eliminated. For example, if the user eliminates "Did Lincoln Shoot?" then "Did Lincoln shoot John Wilkes?" and "Did Lincoln shoot the murder?" will also be eliminated.

Figure 4:
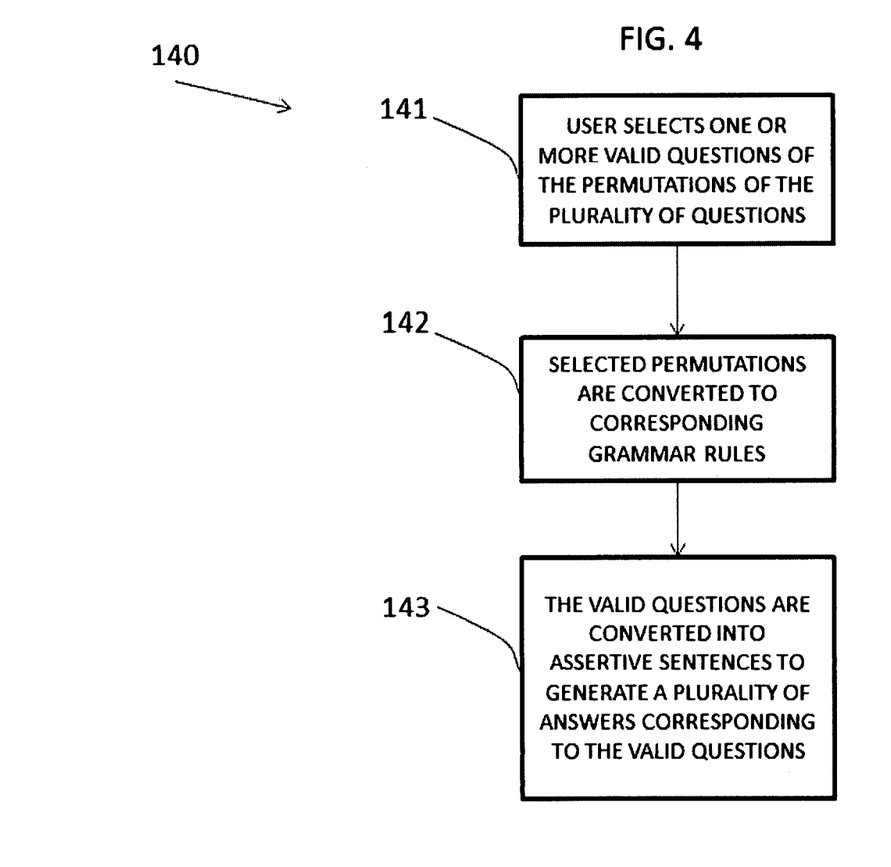
FIG. 4 is a flow diagram illustrating an operation for generating answers and a context free grammar based upon the generation of questions performed in FIG. 3 that can be implemented within embodiments of the present invention.

From operation 130, the process then continues to operation 140 (of FIG. 1) where one or more valid questions as determined by a user along with a corresponding answer to each question are generated. Details regarding operation 140 will now be described below with reference to FIG. 4. As shown in FIG. 4, at operation 141, the user selects at least one valid question of the permutations of the plurality of questions.

From operation 141, the process continues to operation 142, where the permutations selected are converted to a plurality of grammar rules that map on a one-to-one correspondence to the selected questions. For example, the user may select the question: "Did John Wilkes assassinate Licoln?" This phrase corresponds to the permutation denoted by:

<aux>did</aux>
<subject> john wilkes </subject>
<verb>assassinate</verb>
<direct object>Lincoln</direct object>

The grammar rule generated is therefore:

<Q1>=<aux><subject><verb><direct object>

According to a different embodiment of the present invention, said method for generating grammar rules can be utilized as a stand alone for developing any type of speech recognition application or even any type of natural language processing system where grammars are the vehicle for parsing utterances or sentences. Where the user provides the points of information that are to be captured by a system (for example, a transaction system), this method of generating grammars can be applied. For example, an automated ATM where a transfer of funds are to be done with natural language three pieces of information are to be captured and said pieces of information can be depicted in the following XML code:

<TRANSACTION examples="transfer,transfer funds, move money">
<SLOT type="ORIGIN" examples="savings account, checking account" />
<SLOT type="DESTINATION" examples=savings account,checking account" />
<SLOT type="AMOUNT" examples=$NUMBER/>
</TRANSACTION>

Example of the permutations that the user would select are:
transfer funds from savings account to checking account
transfer $600 from checking account to savings account
transfer money from savings account.
$600 to my savings account
$600 from my savings account
to my savings account and the corresponding grammar rules would thereby be generated. In this embodiment of the present invention, the user interface could ask the user to provide certain articles, prepositions, possessive pronouns and other modifiers that accompany the provided information slots, such as "from", "to", "my", etc, which can then be applied as part of the permutation.

From operation 142, the process continues to operation 143, where the plurality of valid questions selected by the user are then converted into assertive sentences via a grammar converting program, for example in order to generate a plurality of answers corresponding to the plurality of questions.

According to an embodiment of the present invention, the method is capable of being performed in different languages. Thus, if performed in the Spanish language, the question may be automatically converted into an assertive sentence.

According to an embodiment of the present invention, based upon the questions selected by the user, the following answers are generated:

"John Wilkes assassinated Lincoln."
"John Wilkes planned the murder."
"John Wilkes shot Lincoln."
"John Wilkes murdered Lincoln."
"Lincoln died."

According to an embodiment of the present invention, the questions and answers generated from the textual information by performing the operations performed in FIGS. 1 through 4 described above, may be used to create frequently asked questions (FAQs) at web pages to be used as a reference by students accessing educational institution or library websites, for example. According to another embodiment of the present invention, this information may also be helpful in summarizing the textual information. An operation for summarizing the textual information will now be discussed below with reference to FIG. 5.

Figure 5:
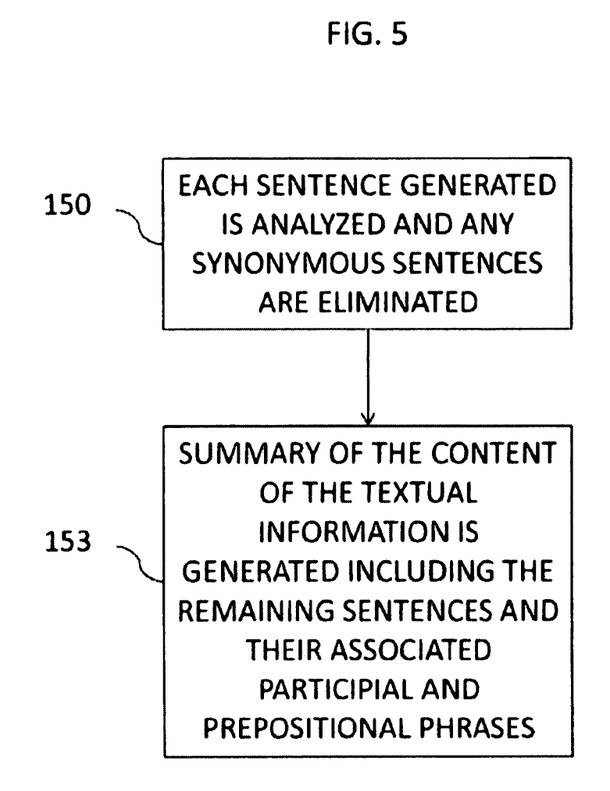
FIG. 5 is a flow diagram illustrating an operation of generating a summary of the textual information based upon the generation of answers performed in FIG. 4 that can be implemented within embodiments of the present invention.

In FIG. 5, at operation 150, each sentence (i.e., an answer) selected by the user is analyzed and any synonymous sentences of the plurality of sentences are eliminated. From operation 150, The process continues to operation 153 where a summary of the content of the textual information including any remaining sentences of the plurality of sentences along with their associated participial and prepositional phrases. For example, referring back to the textual information mentioned above, the following summary is provided.

"John Wilkes Booth assassinated Lincoln on Apr. 14, 1865. John Wilkes Booth planned the murder. John Wilkes Booth shot Lincoln while watching a play at Ford's Theatre in Washington, D.C. Lincoln died the next morning."

As shown, the generated summary includes the most relevant information because it includes the questions and answers generated and pruned by the user.

According to yet another embodiment of the present invention, the above operations may be performed within an automated system where users ask questions about the content of textual information and are provided with answers generated in accordance with embodiments of the present invention. The automated system may be similar to that described in U.S. Pat. No. 7,302,383 entitled "Application and Methods for Developing Conversational Applications by Valles, which is incorporated herein in its entirety. Based upon the methods described above, the textual information would be analyzed and summarized as described above with reference to FIGS. 1 through 5. A method for processing questions received from a user regarding textual information will now be described below with reference to FIG. 6.

Figure 6:
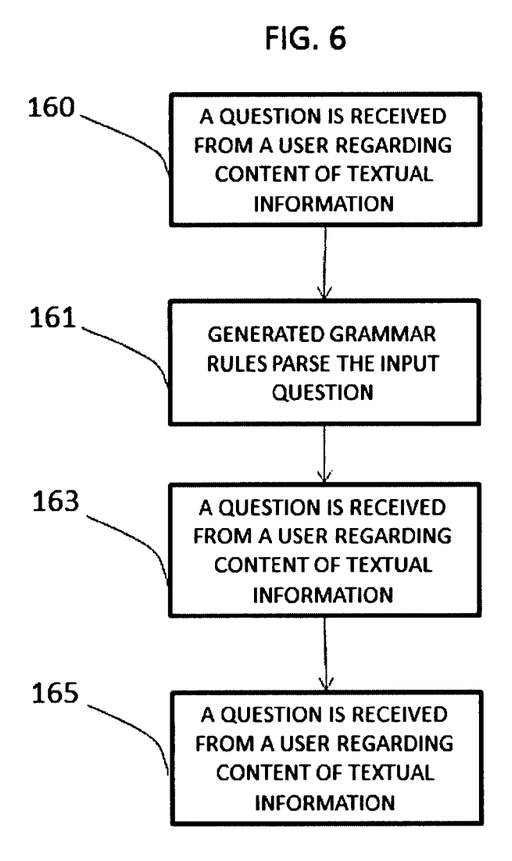
FIG. 6 is a flow diagram illustrating a method for receiving and answering questions of a user via an automated system that can be implemented within embodiments of the present invention.

In FIG. 6, at operation 160, the automated system receives at least one question of the plurality of questions concerning the content of the textual information, From operation 160, the process continues to operation 163, where the plurality of questions are search for a corresponding answer to the at least one question. From operation 163, the process continues to operation 165 where the corresponding answer to the at least one question found and outputting to the user via a user interface.

According to an embodiment of the present invention, the generated grammar rules in operation 142 are now used to properly parse the questions. For example, when question is processed for retrieving an answer as in the system described in U.S. Pat. No. 7,302,383, the generated grammar would be employed in such a system for parsing the question.

According to an embodiment of the present invention, the corresponding answer may be implicitly or explicitly related to the question asked by the user. According to an embodiment of the present invention, the method described above with reference to FIGS. 1 through 5 may be implemented via a system as that shown in FIG. 7. Details regarding the system will now be described below.

Figure 7:
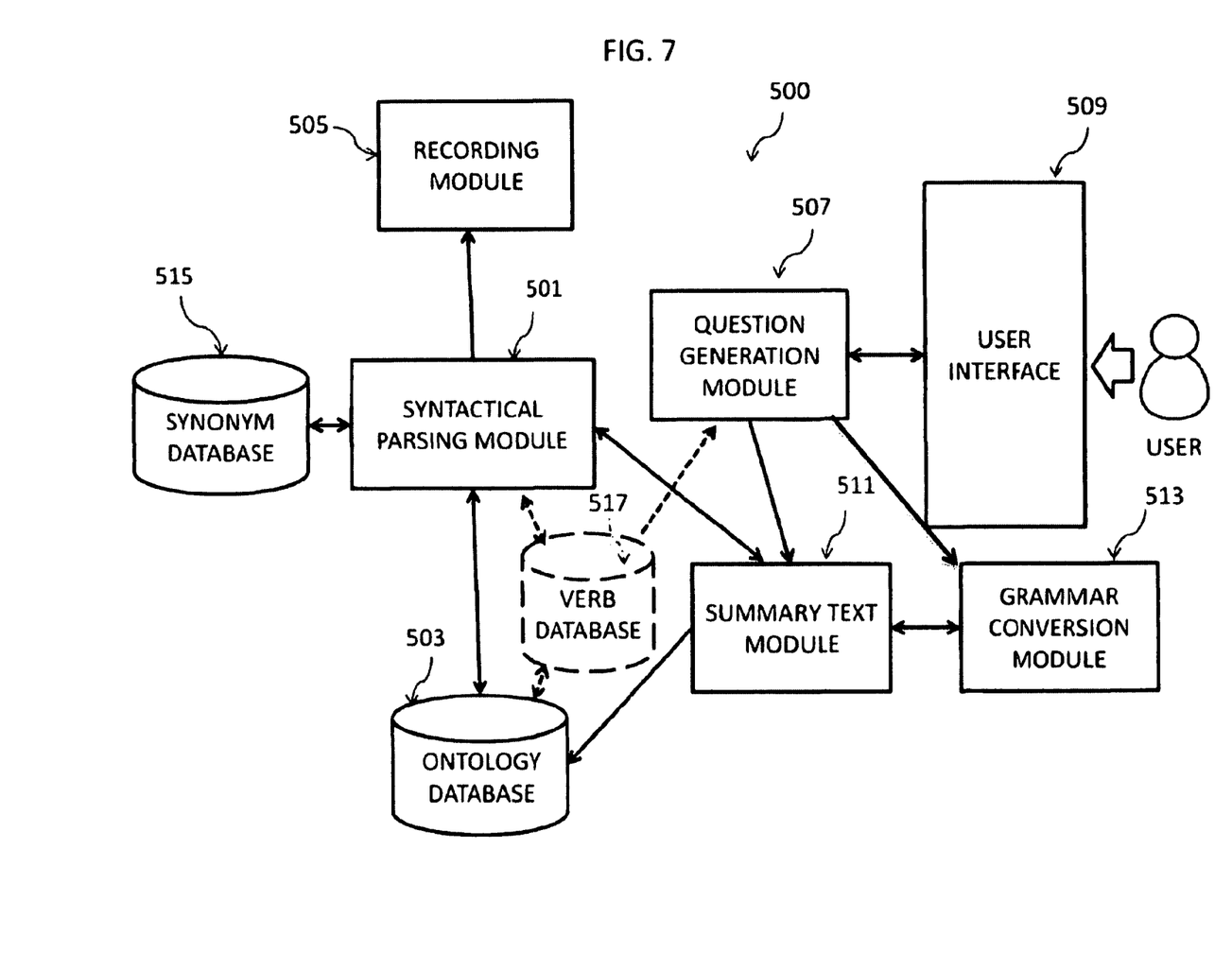
FIG. 7 is a system level diagram of a system for generating answers and questions from textual information that can be implemented within embodiments of the present invention.
Figure 8:
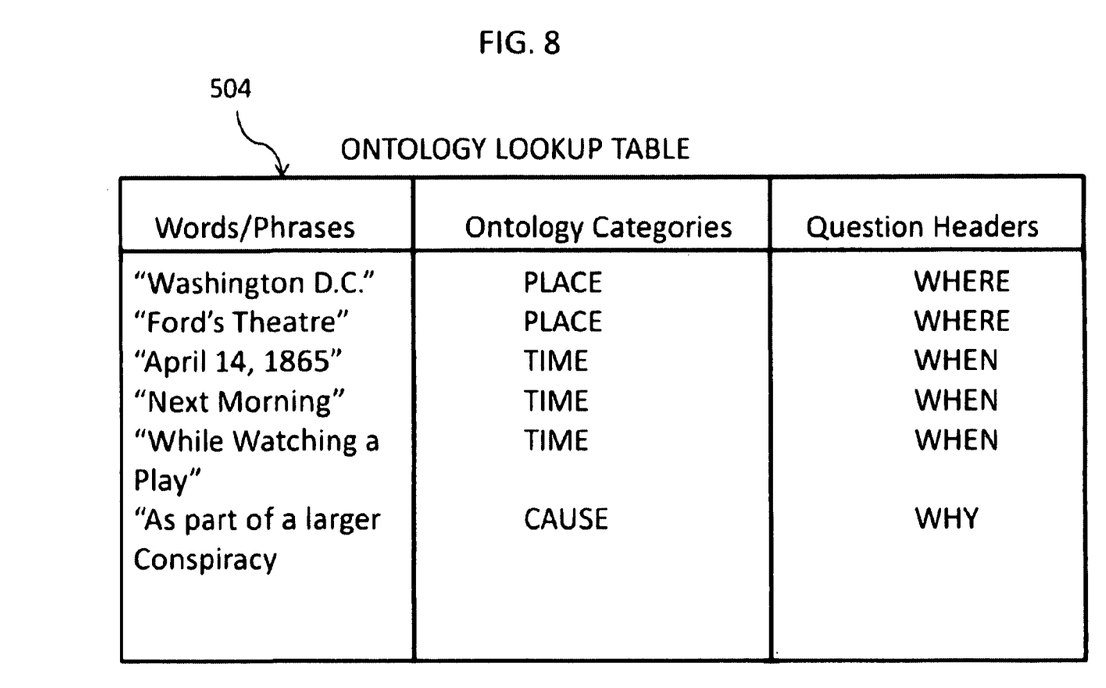
FIG. 8 is a diagram of a lookup table of an ontology database of the system shown in FIG. 7 that can be implemented within embodiments of the present invention.

In FIG. 7, a system 500 includes a syntactical parsing module 501, an ontology database 503 including a lookup table 504 (as depicted in FIG. 8), a recording module 505, a question generation module 507, a user interface 509 such as a graphical user interface (GUI), a summary text module 511, a grammar converter 513, a plurality of databases such as a synonym database 515 and an optional verb database 517.

According to an embodiment of the present invention, the syntactical parsing module 501 analyzes the content of the textual information received via a computer network (as depicted in FIG. 9, for example). According to an embodiment of the present invention, the syntactical parsing module 501 analyzes the textual information by identifying any subjects and direct objects in the content. The syntactical parsing module 501 accesses the synonym database 515 to eliminate any synonyms from the subjects and direct objects identified. For example, if the syntactical parsing module 501 identified both "President Abraham Lincoln" and "Lincoln", upon accessing the synonym database 515, the syntactical parsing module 501 may determine that these terms are synonymous and eliminate one of them.

According to an embodiment of the present invention, the synonym database 515 includes but is not limited to an open source database such as WordNet, which provides a complete thesaurus of a chosen language or a user-maintained thesaurus. According to an embodiment of the present invention, any thesaurus suitable for the purpose set forth herein may be used.

Further, the syntactical parsing module 501 is able to identify verb phrases including at least one main verb, and prepositional phrases corresponding to the verb phrases identified.

According to an embodiment of the present invention, the ontology database 503 maps a plurality of words in the content to a plurality of ontology categories and maps the plurality of ontology categories to a plurality of question headings. This information is then stored within the ontology lookup table 504 as depicted in FIG. 8. The ontology lookup table contains mappings between ontology categories "WHY", "WHERE", "WHO" and "HOW MUCH" and " "CAUSE", "PLACE", "PERSON", "QUANTITY". As shown, in this embodiment, the words and phrases from the textual information mentioned above, are mapped to the respective ontology categories and question headers. For example, Washington, D.C. and Ford's Theatre are mapped to the ontology category "PLACE" and the question header "WHERE" while "April 14, 1865", "next morning" and "while watching a play" are mapped to the ontology category "TIME" and the question header "WHEN". This information is stored in the lookup table 504 of the ontology database 503 to be accessed by the syntactical parsing module 501 as needed.

According to an embodiment of the present invention, the syntactical parsing module 501 accesses the ontology database 503 and maps the prepositional phrases to a corresponding ontology category of the plurality of ontology categories of the lookup table 501. At the same time, the syntactical parsing module 501 retrieves all question headers applicable to the textual information being analyzed. Thus, according to an embodiment of the present invention, the syntactical parsing module 501 may not identify question headers that are unrelated to the textual information being analyzed. That is, in the textual information provided, none of the content thereof is related to "how", "how much" or "how long." Therefore, these question headers would not be identified by the syntactical parsing module 501 for this textual information.

According to an embodiment of the present invention, the recording module receives the subjects and verbs which are identified by the syntactical parsing module 501 and stores them therein. The recording module 505 then generates a main paragraph element as discussed above with reference to FIG. 3.

According to an embodiment of the present invention, the question generation module 507 is in communication with the recording module 505 and receives the main paragraph element including the subjects and verbs therein and automatically derives a plurality of questions from the main paragraph element. According to embodiments of the present invention, the system 500 is capable of processing textual information in different languages. Therefore, the questions may be generated in a language as desired by the user.

Further, the question generation module 507 then combines the subject or subjects with at least one verb to generate all possible permutations. According to an embodiment of the present invention, the optional verb database 517 may be accessed to narrow down the possible permutations generated. The optional verb database 517 includes a lookup table containing all verbs of the textual information represented by a function with arguments of an associated ontology category of the plurality of ontology categories. For example, as mentioned the verb "shoot" may be represented as a function "murder(X,Y) where X and Y may only be of an ontology category type "PERSON". Therefore, narrowing down the permutations such that they don't include permutations where the noun before the verb is not a person, such as "Did the murder shoot Lincoln".

The question generation module 507 presents the plurality of questions derived, to a user via the user interface 509 and the user determines the validity of each question. According to an embodiment where when a user eliminates a single permutation of a question of the plurality of questions, then all permutations including a permutation subset of the single permutation are also eliminated. For example, if the user eliminates "Did Lincoln Shoot?" any other permutation including the phrase "Did Lincoln shoot?" will also be eliminated. Concurrently, all grammar rules associated to said permutations are captured and stored for later use in a question answer retrieval system such as the system described in U.S. Pat. No. 7,302,383 or in an Automated Speech Recognition system.

The user selects all valid questions via the user interface 509 and these questions are then converted into answers via the summary text module 513. According to an embodiment of the present invention, the user may select the longest question of the plurality of questions presented. Alternatively, the system 500 may select the longest question of the plurality of questions when generating a summary of the textual information, based on the questions selected by the user (additional details will be discussed below). As mentioned above, the system 500 processes the textual information in any language. Thus, the answers are generated based upon the language of the questions. For example, according to an embodiment of the present invention, if the questions are in the English language, then the grammar of the questions is converted into an assertive sentence via the grammar conversion module 513. For example, the question "Did John Wilkes Booth assassinated Lincoln?" is converted to "John Wilkes Booth assassinated Lincoln."

According to another embodiment of the present invention, if the questions are generated in the Spanish language, then the summary text module 511 converts the questions into assertive sentences by making minor changes such as changing the punctuation. For example, the question "¿ Wilkes asesinó a Lincoln?" may be converted to an assertive sentence such as ""Wilkes asesinó a Lincoln."

The summary text module 511 then generates the sentences based upon the questions selected by the user. Specifically, the summary text module 511 generates the summary based upon the questions generated and accepted by the user and then the system 500 may select the longest sentence, via the summary text module 511, for example, and sends it back to the syntactical parsing module 501 and the syntactical parsing module 501 then sends it back to the summary text module 511 to be included in the summary. The system 500 then generates a summary of the textual information including the sentences and the participial and prepositional phrases linked to the verbs within the sentences. According to an embodiment of the present invention, the system 500 may traverse the sentences to be included in the summary back into similar sentences from the original textual information provided and include the similar sentences in the summary of the textual information.

FIG. 9 is a diagram illustrating a general purpose computer that can be utilized for implementing embodiments of the present invention. In FIG. 9, computer system 900 has at least one microprocessor or central processing unit (CPU) 905. CPU 905 is interconnected via a system bus 910 to a random access memory (RAM) 915, a read-only memory (ROM) 920, an input/output (I/O) adapter 925 for a connecting a removable data and/or program storage device 930 and a mass data and/or program storage device 935, a user interface adapter 940 for connecting a keyboard 945 and a mouse 950, a port adapter 955 for connecting a data port 960 and a display adapter 965 for connecting a display device 970.

ROM 920 contains the basic operating system for computer system 900. The operating system may alternatively reside in RAM 915 or elsewhere as is known in the art. Examples of removable data and/or program storage device 930 include magnetic media such as floppy drives and tape drives and optical media such as CD ROM drives. Examples of mass data and/or program storage device 935 include hard disk drives and non-volatile memory such as flash memory. In addition to keyboard 945 and mouse 950, other user input devices such as trackballs, writing tablets, pressure pads, microphones, light pens and position-sensing screen displays may be connected to user interface 940. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 930, fed through data port 960 or typed in using keyboard 945.

In view of the above, the present method embodiment may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

Embodiments of the present invention include flash memory management system and a method for managing memory blocks within a memory device of a computer system via data placement (i.e., separation and sorting), garbage collection and wear-leveling. Therefore, the present invention provides the advantages of reducing write amplification since the system discloses moving static data into blocks that are relatively older and dynamic data into blocks that are relatively younger. The present invention also achieves wear-leveling by balancing the cycle count usage of the various blocks and correcting any possible imbalance while improving the performance of the memory device and the endurance lifetime of the memory device by reducing the necessary write operations.

Embodiments of the present invention provide a system and computer-implemented method for automatically deriving questions and answers by analyzing content of textual information and summarizing the content of the textual information using the questions and answers derived. There are several advantages associated with these embodiments, such as allowing for the creation of FAQs and automated systems for interfacing with a user and responding to specific questions that may be asked by a user concerning the content of the textual information.

The terminology used herein is for the purpose of describing particular embodiments only and is not intended to be limiting of the invention. As used herein, the singular forms "a", "an" and "the" are intended to include the plural forms as well, unless the context clearly indicates otherwise: It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for generating every possible meaningful question about a given text comprising:

syntactically and semantically analyzing textual information using a processor;

determining the different parts of speech and semantic components that can be used in a question from said textual information using said processor;

automatically deriving permutations of said parts of speech and semantic components using said processor;

automatically deriving a plurality of questions from said permutations; presenting the plurality of questions derived, to a user via a user interface using said processor;

determining, via the user, a validity of the plurality of questions using said processor; and generating at least one valid question as determined by a user along with a corresponding answer to the at least one valid question using said processor.

2. The computer-implemented method of claim 1, wherein analyzing content of textual information comprises:

mapping a plurality of words in the content to a plurality of ontology categories; mapping the plurality of ontology categories to a plurality of question headings; identifying any subjects and direct objects in the content;

identifying verb phrases including at least one main verb, and identifying participial and prepositional phrases corresponding to the verb phrases identified; and mapping the participial and prepositional phrases to a corresponding ontology category of the plurality of ontology categories.

3. The computer-implemented method of claim 2, wherein the plurality of ontology categories comprise at least one of Time, Time length, Quantity, Place, Manner, Cause, or Person; and the plurality of question headings correspond to the plurality of ontology categories and comprise at least one of When, How Long, How Much, Where, How, What, or When.

4. The computer-implemented method of claim 3, wherein mapping the plurality of ontology categories to the plurality of question headings comprises:

determining patterns between the words of the content, and identifying the plurality of question headings to be mapped based upon the determined patterns.

5. The computer-implemented method of claim 4, wherein automatically deriving a plurality of questions from the analyzed content comprises:

generating a main paragraph element using the subjects and verb phrases identified; and determining permutations of the plurality of questions by combining the subjects with the verb phrases identified.

6. The computer-implemented method of claim 5, wherein presenting the plurality of questions derived, to a user via a user interface and determining, via the user, a validity of the plurality of questions further comprises:

presenting the determined permutations of the plurality of questions to the user; and determining the validity of each permutation of the plurality of questions; and eliminating, via a user, invalid permutations of the plurality of questions.

7. The computer-implemented method of claim 6, wherein when eliminating a single permutation of a question of the plurality of questions, eliminating remaining permutations including a permutation subset of the single permutation.

8. The computer-implemented method of claim 2, further comprising storing the verb phrases as functions with an argument of an associated ontology category of the plurality of ontology categories.

9. The computer-implemented method of claim 2, wherein generating a corresponding answer comprises:

converting the at least one question into an assertive sentence.

10. The computer-implemented method of claim 9, wherein when a plurality of questions are determined to be valid by the user, the method further comprises:
converting the plurality of questions into assertive sentences to generate a plurality of answers corresponding to the plurality of questions;
analyzing each sentence and eliminating any synonymous sentences of the plurality of sentences; and
generating a summary of the content of the textual information, including any remaining sentences of the plurality of sentences after elimination.

11. The computer-implemented method of claim 10, wherein analyzing each sentence comprises:
selecting a longest sentence of the plurality of sentences, to be included in the summary,
generating the summary to include the sentences and the participial and prepositional phrase linked to the verbs within the sentences.

12. The computer-implemented method of claim 11, further comprises:
traversing the selected sentences to be included in the summary back into similar sentences from the textual information and including the similar sentences in the summary.

13. The computer-implemented method of claim 1, further comprising:
receiving, via a user, at least one question of the plurality of questions concerning the content of the textual information;
analyzing the plurality of questions to search for a corresponding answer to the at least one question; and
outputting, to the user, the corresponding answer to the at least one question found.

14. The computer-implemented method of claim 13, wherein the corresponding answer is implicitly or explicitly related to the at least one question.

15. Apparatus for generating every possible meaningful question about a given text comprising:
a processor,
a plurality of user interfaces for allowing humans to input a text or plurality of texts consisting of natural language phrases,
a plurality of storing device for storing and retrieving text documents and having executable instructions stored therein and,
wherein said processor is configured to execute said group of executable instructions stored in memory and said groups of executable instructions further comprise program logic responsive to said input and configurable to:
i. breaking up said texts into distinct phrases,
ii. breaking up said phrases into syntactical categories,
iii. transforming said syntactical categories into semantic categories,
iv. automatically deriving new phrasal structures from said semantic categories and said syntactical categories by further permuting said syntactical categories based on the information provided by said semantic categories,
v. applying a plurality of rules of syntax and semantics to all said generated phrasal structure permutations,
vi. automatically eliminating all generated phrasal structure permutations that do not meet said rules of syntax and semantics for constructing eligible questions,
vii. automatically deriving questions from the left over generated phrasal structures.

16. Apparatus of claim 15, wherein analyzing content of textual information comprises:
mapping a plurality of words in the content to a plurality of ontology categories;
mapping the plurality of ontology categories to a plurality of question headings;
identifying any subjects and direct objects in the content;
identifying verb phrases including at least one main verb, and identifying participial and prepositional phrases corresponding to the verb phrases identified; and
mapping the participial and prepositional phrases to a corresponding ontology category of the plurality of ontology categories.

17. Apparatus of claim 16, wherein the plurality of ontology categories comprise at least one of Time, Time length, Quantity, Place, Manner, Cause, or Person; and the plurality of question headings correspond to the plurality of ontology categories and comprise at least one of When, How Long, How Much, Where, How, What, or When.

18. Apparatus of claim 16, wherein mapping the plurality of ontology categories to the plurality of question headings comprises:
determining patterns between the words of the content, and identifying the plurality of question headings to be mapped based upon the determined patterns.

19. Apparatus of claim 18, wherein automatically deriving a plurality of questions from the analyzed content comprises:
generating a main paragraph element using the subjects and verb phrases identified; and
determining permutations of the plurality of questions by combining all the different phrasal categories found in the phrasal structure.

20. Apparatus of claim 19, wherein plurality of questions derived are further analyze by syntactical parser containing syntactical rules of the natural language and further determining whether the question generated is syntactically correct, thereby eliminating the questions that are not syntactically correct.

21. Apparatus of claim 19, wherein plurality of questions derived are further analyze by semantic parser containing semantic rules of the natural language and further determining whether the question generated is semantically correct, thereby eliminating the questions that do not have a meaning.

22. Apparatus of claim 19, wherein when eliminating a single permutation of a question of the plurality of questions, eliminating remaining permutations including a permutation subset of the single permutation.

23. Apparatus of claim 16, wherein the method further comprises:
storing the verb phrases as functions with an argument of an associated ontology category of the plurality of ontology categories.

24. Apparatus of claim 16, wherein generating a corresponding answer comprises:
converting the at least one question into an assertive sentence.

25. Apparatus of claim 23, wherein when a plurality of questions are determined to be valid by the user, the method further comprises:
converting the plurality of questions into assertive sentences to generate a plurality of answers corresponding to the plurality of questions;
analyzing each sentence and eliminating any synonymous sentences of the plurality of sentences; and
generating a summary of the content of the textual information, including any remaining sentences of the plurality of sentences after elimination.

26. Apparatus of claim 25, wherein analyzing each sentence comprises:
- selecting a longest sentence of the plurality of sentences, to be included in the summary; and
- generating the summary to include the sentences and the participial and prepositional phrase linked to the verbs within the sentences.

27. Apparatus of claim 26, further comprises:
- traversing the selected sentences to be included in the summary back into similar sentences from the textual information and including the similar sentences in the summary.

* * * * *